United States Patent
Gonzalez et al.

(10) Patent No.: US 12,090,955 B2
(45) Date of Patent: Sep. 17, 2024

(54) VEHICLE INTELLIGENT ASSISTANT USING CONTEXTUAL DATA

(71) Applicant: AirWire Technologies, Reno, NV (US)

(72) Inventors: Gerardo Gonzalez, Allen, TX (US); Debashis Bagchi, Reno, NV (US)

(73) Assignee: AirWire Technologies, Reno, NV (US)

( * ) Notice: Subject to any disclaimer, the term of this patent is extended or adjusted under 35 U.S.C. 154(b) by 0 days.

(21) Appl. No.: 16/942,722

(22) Filed: Jul. 29, 2020

(65) Prior Publication Data

US 2021/0078539 A1    Mar. 18, 2021

Related U.S. Application Data

(60) Provisional application No. 62/879,955, filed on Jul. 29, 2019.

(51) Int. Cl.
*B60R 25/00*    (2013.01)
*B60K 35/00*    (2006.01)
(Continued)

(52) U.S. Cl.
CPC .......... *B60R 25/305* (2013.01); *B60K 35/00* (2013.01); *B60R 25/102* (2013.01);
(Continued)

(58) Field of Classification Search
CPC ............... B60R 25/305; B60R 25/102; B60R 25/2045; B60K 35/00; B60K 2370/52; B60K 2370/146; G06K 9/00295; G06K 9/00335; G06K 9/00845; G06K 9/00785; G06K 9/00; G06K 9/00624; G06K 9/00221; G06K 9/00771; G06K 2209/15;
(Continued)

(56) References Cited

U.S. PATENT DOCUMENTS 5,289,369 A    2/1994    Hirshberg
5,893,893 A    4/1999    Holt et al.
(Continued)

FOREIGN PATENT DOCUMENTS

| CN | 2680523 Y | * | 2/2005 |
| CN | 107590763 A | * | 1/2018 |
| WO | WO 2020/091806 | | 5/2020 |

OTHER PUBLICATIONS

U.S. Appl. No. 16/940,173 Final Office Action dated Nov. 9, 2021.
(Continued)

*Primary Examiner* — James J Yang
*Assistant Examiner* — Anthony D Afrifa-Kyei
(74) *Attorney, Agent, or Firm* — Polsinelli LLP

(57) ABSTRACT

The present disclosure is directed to methods and apparatus that may collect data from at a vehicle. Data may be collected by connecting to a port of an on board diagnostic bus at the vehicle or this data may be received via a wireless communication interface. Collected data may be stored at a database and this data may be analyzed to identify whether a person at a vehicle is authorized to access or drive the vehicle. This collected data may also be analyzed to identify faults that may occur at a vehicle and recommendations to responding those faults may be provided to a driver of the vehicle via a user interface such as a speaker or display at the vehicle.

18 Claims, 9 Drawing Sheets

(51) Int. Cl.
- *B60R 25/102* (2013.01)
- *B60R 25/20* (2013.01)
- *B60R 25/30* (2013.01)
- *G06V 20/59* (2022.01)
- *G06V 40/16* (2022.01)
- *G06V 40/20* (2022.01)
- *B60K 35/10* (2024.01)
- *B60K 35/26* (2024.01)
- *B60K 35/81* (2024.01)

(52) U.S. Cl.
CPC ........ *B60R 25/2045* (2013.01); *G06V 20/597* (2022.01); *G06V 40/173* (2022.01); *G06V 40/20* (2022.01); *B60K 35/10* (2024.01); *B60K 35/26* (2024.01); *B60K 35/81* (2024.01); *B60K 2370/146* (2019.05)

(58) Field of Classification Search
CPC ...... G06N 20/00; G06N 7/005; G06N 3/0445; G08B 13/196; G08B 27/001; G08B 7/06; G08B 3/00; G08B 6/00
See application file for complete search history.

(56) References Cited

U.S. PATENT DOCUMENTS

| | | | |
|---|---|---|---|
| 6,339,745 B1 | 1/2002 | Novik | |
| 6,963,899 B1 | 11/2005 | Fernandez et al. | |
| 8,234,173 B1 | 7/2012 | Kumar | |
| 8,234,216 B1 | 7/2012 | Reese et al. | |
| 8,468,214 B1 | 6/2013 | Bourlas et al. | |
| 8,694,328 B1 | 4/2014 | Gormley | |
| 9,230,379 B2 | 1/2016 | Ricci | |
| 9,536,197 B1 | 1/2017 | Penilla et al. | |
| 9,996,878 B1 | 6/2018 | Fox et al. | |
| 10,124,682 B2 | 11/2018 | Tsuchiya | |
| 10,134,042 B1 | 11/2018 | Prasad et al. | |
| 10,198,877 B1 | 2/2019 | Maltsev et al. | |
| 10,470,025 B1 | 11/2019 | Hunt et al. | |
| 10,629,191 B1 | 4/2020 | Cheng et al. | |
| 10,791,417 B1 | 9/2020 | Nicholson et al. | |
| 10,940,790 B1 * | 3/2021 | Mazuir | H05B 47/12 |
| 2001/0039509 A1 | 11/2001 | Dar et al. | |
| 2002/0111822 A1 | 8/2002 | Shimizu et al. | |
| 2003/0028451 A1 | 2/2003 | Ananian | |
| 2003/0065427 A1 | 4/2003 | Funk et al. | |
| 2003/0088348 A1 | 5/2003 | Gustavsson et al. | |
| 2004/0139034 A1 | 7/2004 | Farmer | |
| 2005/0075829 A1 | 4/2005 | Polimadei | |
| 2007/0005233 A1 | 1/2007 | Pinkus et al. | |
| 2007/0061057 A1 | 3/2007 | Huang et al. | |
| 2007/0136088 A1 | 6/2007 | Farrel | |
| 2007/0233363 A1 | 10/2007 | Rosario et al. | |
| 2008/0052180 A1 | 2/2008 | Lawhorn | |
| 2008/0119965 A1 | 5/2008 | McCrary | |
| 2009/0006194 A1 | 1/2009 | Sridharan et al. | |
| 2009/0018770 A1 | 1/2009 | Burgess et al. | |
| 2009/0076949 A1 | 3/2009 | Olliphant et al. | |
| 2009/0222338 A1 | 9/2009 | Hamilton et al. | |
| 2010/0042340 A1 | 2/2010 | Piszko | |
| 2010/0063717 A1 | 3/2010 | Proefke et al. | |
| 2010/0082246 A1 | 4/2010 | Crane | |
| 2010/0106401 A1 | 4/2010 | Naito et al. | |
| 2010/0127847 A1 | 5/2010 | Evans et al. | |
| 2010/0138146 A1 | 6/2010 | Vogt et al. | |
| 2010/0145609 A1 | 6/2010 | Boss et al. | |
| 2010/0198508 A1 | 8/2010 | Tang | |
| 2010/0217482 A1 | 8/2010 | Vogel et al. | |
| 2010/0228639 A1 | 9/2010 | Gindele | |
| 2011/0112870 A1 | 5/2011 | Berg et al. | |
| 2011/0191220 A1 | 8/2011 | Kidston et al. | |
| 2011/0224900 A1 | 9/2011 | Hiruta et al. | |
| 2011/0246330 A1 | 10/2011 | Tikku et al. | |
| 2012/0136865 A1 | 5/2012 | Blom et al. | |
| 2012/0179347 A1 | 7/2012 | Aldighieri et al. | |
| 2012/0271725 A1 | 10/2012 | Cheng | |
| 2012/0323664 A1 | 12/2012 | Klems | |
| 2013/0144471 A1 | 6/2013 | Min et al. | |
| 2013/0179057 A1 | 7/2013 | Fischer et al. | |
| 2013/0261953 A1 | 10/2013 | Kiyama et al. | |
| 2013/0274972 A1 | 10/2013 | Kusumi et al. | |
| 2013/0289837 A1 | 10/2013 | Beams et al. | |
| 2013/0308470 A1 | 11/2013 | Bevan et al. | |
| 2014/0032101 A1 | 1/2014 | Pandya et al. | |
| 2014/0136187 A1 | 5/2014 | Wolverton et al. | |
| 2014/0188388 A1 | 7/2014 | Malahy et al. | |
| 2014/0199980 A1 | 7/2014 | Rao et al. | |
| 2014/0200038 A1 | 7/2014 | Rao et al. | |
| 2014/0207959 A1 | 7/2014 | Kamali et al. | |
| 2014/0210604 A1 | 7/2014 | Kawashima et al. | |
| 2014/0278056 A1 | 9/2014 | Williams et al. | |
| 2014/0309868 A1 * | 10/2014 | Ricci | H04W 12/084 701/36 |
| 2014/0359499 A1 | 12/2014 | Cho et al. | |
| 2014/0372221 A1 | 12/2014 | Momin et al. | |
| 2015/0112730 A1 | 4/2015 | Binion et al. | |
| 2015/0112731 A1 | 4/2015 | Binion et al. | |
| 2015/0112800 A1 | 4/2015 | Binion et al. | |
| 2015/0158393 A1 | 6/2015 | Kawano et al. | |
| 2015/0195678 A1 | 7/2015 | Fay et al. | |
| 2015/0210292 A1 | 7/2015 | George-Svahn et al. | |
| 2015/0213420 A1 | 7/2015 | Krishnamurthy et al. | |
| 2015/0213518 A1 | 7/2015 | Krishnamurthy et al. | |
| 2015/0213519 A1 | 7/2015 | Krishnamurthy et al. | |
| 2015/0278933 A1 | 10/2015 | Barfield | |
| 2015/0310451 A1 | 10/2015 | Plagens et al. | |
| 2015/0363986 A1 * | 12/2015 | Hoyos | H04W 4/40 340/5.61 |
| 2016/0311410 A1 | 10/2016 | Donzis et al. | |
| 2016/0349075 A1 | 12/2016 | Son | |
| 2017/0067747 A1 * | 3/2017 | Ricci | G06Q 10/00 |
| 2017/0103327 A1 | 4/2017 | Penilla et al. | |
| 2017/0256106 A1 | 9/2017 | Hino | |
| 2018/0031381 A1 | 2/2018 | Delaruelle | |
| 2018/0143029 A1 | 5/2018 | Nikulin et al. | |
| 2018/0286245 A1 | 10/2018 | Obaidi | |
| 2018/0300337 A1 | 10/2018 | Thomas et al. | |
| 2018/0350167 A1 | 12/2018 | Ekkizogloy et al. | |
| 2019/0084420 A1 | 3/2019 | Kim et al. | |
| 2019/0178661 A1 | 6/2019 | Sakaida et al. | |
| 2019/0184774 A1 | 6/2019 | Okada | |
| 2019/0189132 A1 | 6/2019 | Viswanathan | |
| 2019/0193681 A1 * | 6/2019 | Ito | B60R 25/246 |
| 2019/0316922 A1 * | 10/2019 | Petersen | G01C 21/3617 |
| 2019/0318035 A1 | 10/2019 | Blanco et al. | |
| 2020/0027283 A1 | 1/2020 | Nishikawa | |
| 2020/0055518 A1 * | 2/2020 | Johnson | B60W 50/08 |
| 2020/0092689 A1 | 3/2020 | Zhang et al. | |
| 2020/0193549 A1 | 6/2020 | Pedersen et al. | |
| 2020/0211553 A1 | 7/2020 | Bohl et al. | |
| 2020/0238952 A1 * | 7/2020 | Lindsay | G06V 30/194 |
| 2020/0247195 A1 | 8/2020 | Kona et al. | |
| 2020/0250696 A1 | 8/2020 | Cordell | |
| 2020/0250898 A1 | 8/2020 | Rafferty et al. | |
| 2021/0081863 A1 | 3/2021 | Gonzalez | |
| 2021/0082207 A1 | 3/2021 | Gonzalez | |
| 2021/0173377 A1 | 6/2021 | Laftchiev et al. | |
| 2021/0217409 A1 | 7/2021 | Choi et al. | |
| 2021/0404833 A1 | 12/2021 | Padeimaite et al. | |

OTHER PUBLICATIONS

AirWire Connected CAR IoT Device, AirWire Technologies, Sep. 2016.
AirWire Technologies and Reliance Jio Partner to Bring Connected Car Apps and Services to India, Business Wire, Feb. 26, 2017. https://www.businesswire.com/news/home/20170226005089/en/AirWire-Technologies-and-Reliance-Jio-Partner-to-Bring-Connected-Car-Apps-and-Services-to-India (Year: 2017).
U.S. Appl. No. 16/940,173 Office Action dated Jun. 28, 2021.
U.S. Appl. No. 16/940,173 Final Office Action mailed Jul. 6, 2023.
U.S. Appl. No. 16/940,173 Office Action mailed Aug. 11, 2022.

(56) References Cited

OTHER PUBLICATIONS

U.S. Appl. No. 16/942,679 Final Office Action mailed Jun. 20, 2023.
U.S. Appl. No. 16/942,679 Office Action mailed Aug. 11, 2022.
Macro, computer science, wikipedia, archives org Feb. 11, 2020 http://web.archive.org/web/20200211082902/https://en.wikipedia.org/wiki/Macro_(computer_science) (Year: 2020).
U.S. Appl. No. 16/940,173 Office Action mailed Apr. 16, 2024.

* cited by examiner

VEHICLE INTELLIGENT ASSISTANT USING CONTEXTUAL DATA

CROSS-REFERENCE TO RELATED APPLICATIONS

The present application claims the priority benefit of U.S. provisional patent application 62/879,955, filed Jul. 29, 2019, the disclosure of which is incorporated herein by reference.

BACKGROUND OF THE INVENTION

Field of the Disclosure

The present disclosure is generally related to a system and method for integrating with the vehicle engine bus so as to enable an intelligent system to automate controls and operation of a vehicle based on contextual information and data.

Description of the Related Art

Vehicles when they are produced today include computing devices that collect data regarding the performance of various systems within a vehicle. Modern vehicles also include an on board diagnostic computer bus (OBD) that service technicians may couple devices to such that fault codes and certain operational characteristics of a vehicle may be monitored. Today vehicles are manufactured that include an ODB version 2 bus (OBD-II), these ODB buses include connection ports to which diagnostic or monitoring equipment may be connected when a technician evaluates performance characteristics or fault codes of a vehicle.

While diagnostic busses included in vehicles today are made according to a standard, only diagnostic devices owned by service technicians have been manufactured to collect and evaluate data communicated over a diagnostic bus. What are needed are new types of equipment that provide new functions to vehicle owners as their vehicles are used.

SUMMARY OF THE PRESENTLY CLAIMED INVENTION

The presently claimed invention relates to a method, a non-transitory computer-readable storage medium, and an apparatus that evaluates data. A first embodiment of the presently claimed invention is a method that receives image data from an optical sensor, identifies that the image data includes facial data of a person, identifies that the facial data does not belong to a primary driver, sends a message to an electronic device of a user, and receives a response from the user electronic device, wherein the person is allowed to access the vehicle according to the response.

A second embodiment of the presently claimed invention is a non-transitory computer-readable storage medium where a processor executes instructions to perform the presently claimed method. Here again the method may include receiving image data from an optical sensor, identifying that the image data includes facial data of a person identifying that the facial data does not belong to a primary driver sending a message to an electronic device of a user, and receiving a response from the user electronic device, wherein the person is allowed to access the vehicle according to the response.

A third embodiment of the presently claimed invention is an apparatus that includes an optical sensor that receives image data. The Apparatus may also include a memory and a processor that executes instructions out of the memory to identify that the image data includes facial data of a person, identify that the facial data does not belong to a primary driver, send a message to an electronic device of a user, and receive a response from the user electronic device, wherein the person is allowed to access the vehicle according to the response

BRIEF DESCRIPTIONS OF THE DRAWINGS

Figure 8:
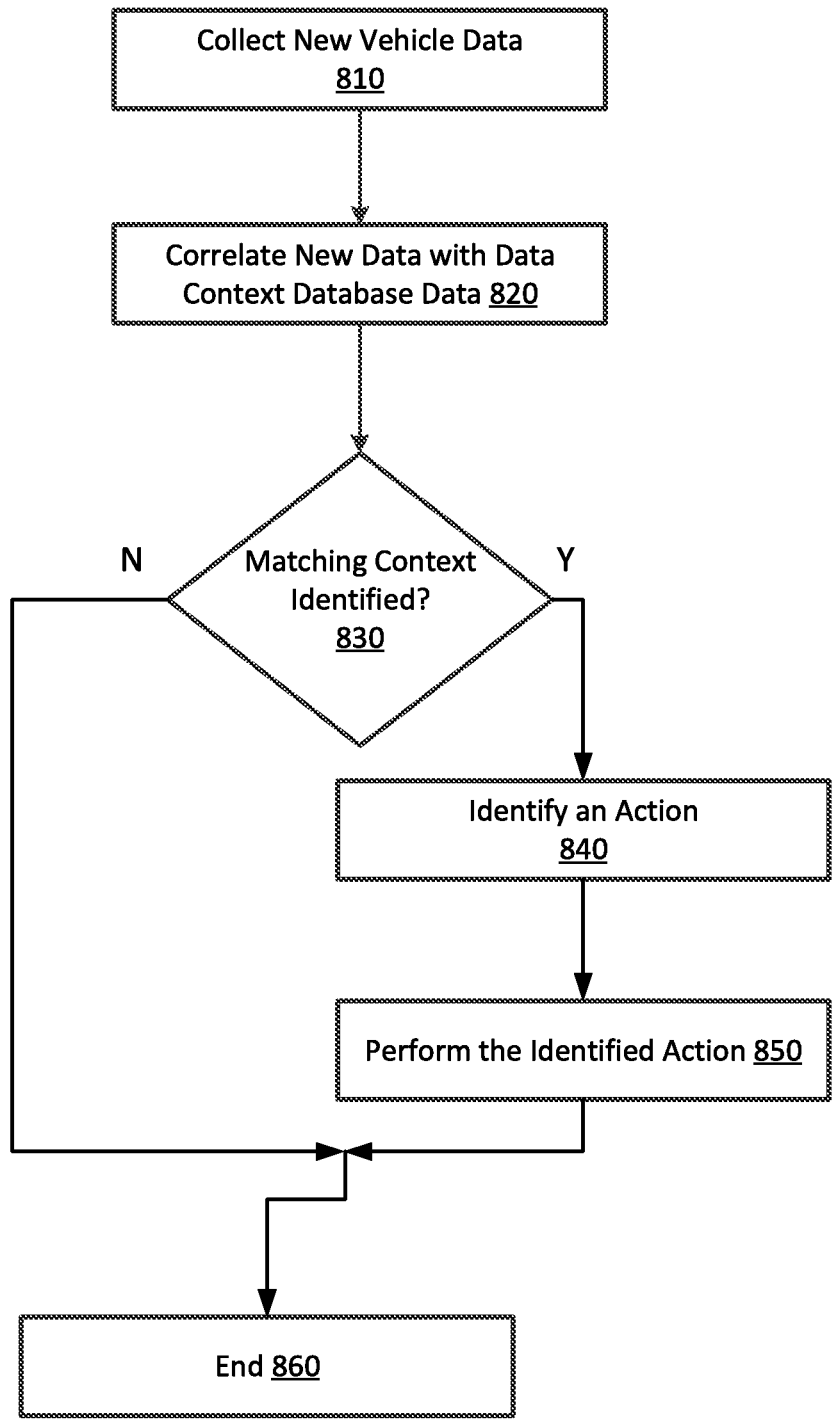

FIG. 8 includes steps that may be performed with collected contextual information is analyzed.

Figure 9:
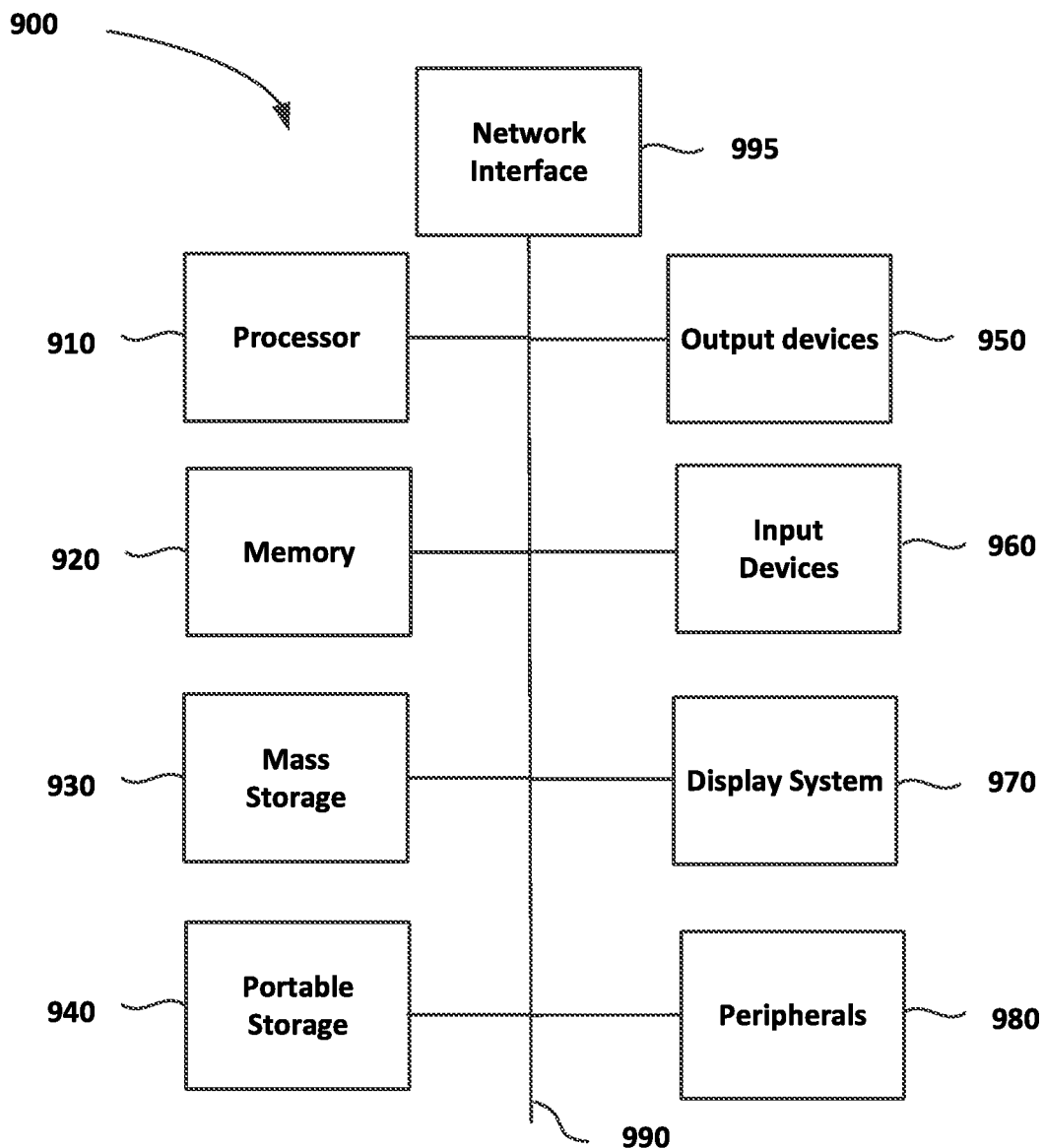

FIG. 9 illustrates a computing system that may be used to implement an embodiment of the present invention.

DETAILED DESCRIPTION

The present disclosure is directed to methods and apparatus that may collect data from at a vehicle. Data may be collected by connecting to a port of an on board diagnostic bus at the vehicle or this data may be received via a wireless communication interface. Collected data may be stored at a database and this data may be analyzed to identify whether a person at a vehicle is authorized to access or drive the vehicle. This collected data may also be analyzed to identify faults that may occur at a vehicle and recommendations to responding those faults may be provided to a driver of the vehicle via a user interface such as a speaker or display at the vehicle.

Figure 1:
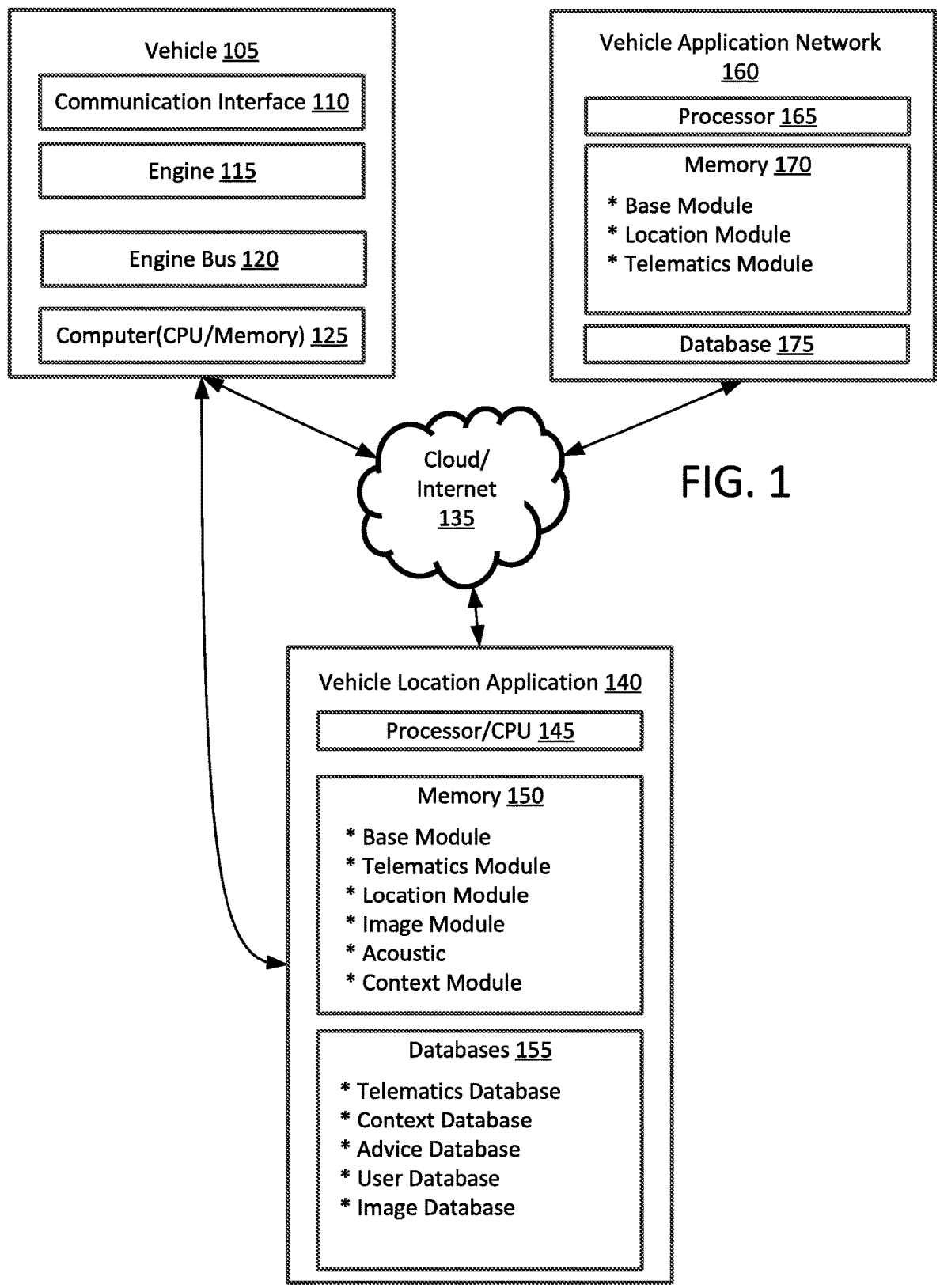
FIG. 1 illustrates a system evaluates image, acoustic data, and other data collected at sensors or cameras at a vehicle.

FIG. 1 illustrates a system evaluates image, acoustic data, and other data collected at sensors or cameras at a vehicle. Collected data may be evaluated and associated with the identity of a driver, an emotional state of the driver, acoustic noise, or other information may be evaluated to provide recommendations to a driver of the vehicle FIG. 1 includes a vehicle 105. Vehicle 105 may be any type of vehicle, such as a car, motorcycle, truck, van or RV, boat, or airplane that has on that has an onboard diagnostic port (e.g. a OBD-II port) but that may lack factory-installed communications equipment. Communication interface 110 of on the vehicle 105 may allow computer 125 of vehicle 105 to communicate to other electronic devices via cloud or Internet 135 or via another communication medium. Computer 125 may be coupled to an on board engine diagnostic bus 120 via a standard OBD port connection or via a wireless communications link such as Bluetooth, Wi-Fi, Cellular, 4G, 5G, or a long-term evolution (LTE) link. Vehicle 105 also includes engine 115 that powers the vehicle. Engine 115 may be an internal combustion engine, electric motor, or may be an engine in a hybrid-electric motor-generator-battery configuration.

Engine bus 120 may be a specialized internal communications network that interconnects components inside a vehicle 105 to other computing devices. Special requirements for vehicle control administrated by a computer may include assured message delivery, non-conflicting message delivery, minimum time message delivery, low cost message delivery, and of electromagnetic frequency (EMF) noise resilience. Such requirements may also include redundant routing or other characteristics that may have been mandated or include the use of common or uncommon networking protocols. Such exemplary network protocols may include, yet are not limited to a controller area network (CAN), local interconnect network (LIN). All cars sold in the United States since 1996 have required an on-board diagnostic (OBD) port that complies with the OBD-II standard, OBD-II is an improvement over OBD-I in both capability and standardization. The OBD-II standard specifies the type of diagnostic connector and its pinout, the electrical signaling protocols available, and the messaging format. It also provides a candidate list of vehicle parameters to monitor along with how to encode the data for each. These diagnostic computer connectors include a pin in the connector that provides power for the scan tool from the vehicle battery. This eliminates the need to connect a scan tool to a power source separately. However, some technicians might still connect a scan tool to an auxiliary power source to protect data collected by the scan tool in the unusual event that a vehicle experiences a loss of electrical power due to a malfunction. Finally, the OBD-II standard provides a list of standardized diagnostic trouble codes (DTCs). As a result of this standardization, a single device can query the on-board computer(s) for parameters in any vehicle and the DTC codes may be used to identify components within a vehicle that are failing or these codes may indicate that the vehicle components are operating within normal operating parameters. The OBD-II standard was prompted to simplify diagnosis of increasingly complicated emissions equipment, and though only emission-related codes and data are required to be transmitted through it according to U.S. legislation, most manufacturers have made the OBD-II data link connector the main connector in the vehicle through which all systems are diagnosed and reprogrammed. Cloud or Internet 135 may be the on-demand availability of computer system resources, especially data storage and computing power, without direct active management by the user. The term is generally used to describe data centers available to many users over the Internet. Large clouds, predominant today, often have functions distributed over multiple locations from central servers. If the connection to the user is relatively close, it may be designated an edge server.

The vehicle application network (VAN) 160 connects and communicates to at least one vehicle 105 through the communication interface 110 via the Internet or cloud 135. The vehicle application network 160 also includes a memory that may store various software modules, such as a base module, a location module, and a telematics module of the vehicle application network (VAN). Vehicle 160 may also include processor 165 that executes instructions out of a memory and a database 175 that may be accessed by processor 165. While not illustrated, processor 165 may be coupled to a communication network that allows the vehicle application network 160 computer to communication with vehicle computer 105. The processor 165 of vehicle application network 160 may collects data from the vehicle computer 125.

A communication interface coupled to processor 165 may allow the vehicle application network (VAN) continuously communicate with vehicle computer 105. The vehicle application network (VAN) base module stored in memory 170 at vehicle application network 160 may initiate operation instructions of the VAN location module and the VAN telematics module stored in the memory 170 of the vehicle application network 160. Instructions of the VAN location module and the VAN telematics module stored in the memory 170 may be initiated or executed in sequenced fashion or in parallel fashion. Operation of the VAN location module may be initiated by the VAN base module. This process may start by continuously polling at least one vehicle computer 125 for a current location of the vehicle 105. This location information may be stored in database 175 that may be referred to as the VAN database 175.

The VAN telematics module may be initiated by instructions of the VAN base module. This process may result in telematics data being collected from vehicle computer 110 by communications sent via communication interface 110 and the cloud or Internet. Functions associated with the use of telematics may include but not limited to, sending, receiving and storing information using telecommunication devices to control remote objects, the integrated use of telecommunications and informatics for application in vehicles, the control vehicles on the move. These functions may rely on or use a form of and global navigation satellite system technology, such as the global positioning system (GPS). Such functionality may be integrated with computers and mobile communications technology in automotive navigation systems.

The VAN database 175 may store data collected by vehicle computer 105 based on communications received via communication interface 110. The data stored in the VAN database 175 can be used for a number of applications, such as, but not limited to, fleet management, improved navigation, vehicle maintenance, vehicle and user safety, and insurance.

FIG. 1 also includes a vehicle location application (VLA) 140 computing device. This VLA device 140 is illustrated at including processor/CPU 145, memory 150, and database 155. Memory 150 stores software modules that include a base module, a telematics module, a location module, an image module, an acoustic module, and a context module. Each of these software modules stored in memory 150 of VLA device 140 may be referred to a VLA base module, a VLA telematics module, a VLA location module, a VLA image module, a VLA acoustic module, a VLA context module.

The VLA device may store and perform functions of the VLA base module, VLA telematics module, VLA location module, image module, VLA acoustics module, VLA context module in memory 150. The various databases 155 accessible to VLA device 140 include (VLA) telematics database, context database, advice database, and image database. VLA device 140 may communicatively connect to the vehicle computer 110 via a communications port such as an OBD compatible port to collect data and to control operations the vehicle 105. Alternatively VLA device 140 may connect and communicate with the vehicle computer 125 via Bluetooth, Wi-Fi, or cellular wireless communication medium. This may allow VLA device 140 to process vehicle and contextual data of vehicle 105.

The VLA base module stored in memory 150 may be initiated when the vehicle computer 125 is accessed or when vehicle 105 is turned on. VLA device 140 may continuously poll the vehicle computer 125 to see if the vehicle 105 is running. Instructions of the VLA base module when executed by processor 145 may be initiate operation of the VLA telematics module, VLA location module, image module, VLA acoustics module, and VLA context module stored in memory 150. The modules can be initiated in sequence or in a parallel fashion. For example, in one embodiment operation of the image module may be initiated when vehicle computer 110 is accessed for the purpose of identifying a person entering vehicle 105 for security purposes. Once all the modules have been initiated by the VLA base module, operation of the VLA base module may end until vehicle 105 is turned off and then turned back on again.

The VLA telematics module may be initiated by the VLA base module. This may result in telematics data being collected from vehicle computer 110 through a communications port such as but not limited to, an OBD port, a Bluetooth connection, or other wired or r communication connection. Telematics data may include but not limited to, sending, receiving and storing information using telecommunication devices to control remote objects, the integrated use of telecommunications and informatics for application in vehicles and to control vehicles on the move, and global navigation satellite system technology integrated with computers and mobile communications technology in automotive navigation systems, (most narrowly) the use of such systems within road vehicles, also called vehicle telematics.

Operation of the VLA location module may be is initiated by the VLA base module. This may cause processor 145 to continuously poll vehicle's GPS system or other location sensors when a current position of the vehicle is identified. The location of the vehicle 105 may be continuously polled until the vehicle 105 is turned off. The location data acquired from the VLA location module at Memory 150 may be stored in stored in the VLA Telematics database of databases 155. A vehicle tracking system may combine the use of automatic vehicle location of individual vehicles with software that collects fleet data for a comprehensive picture of vehicle locations. Modern vehicle tracking systems commonly use GPS or GLONASS technology for locating the vehicle, but other types of automatic vehicle location technology can also be used. Vehicle information can be viewed on electronic maps via the Internet or specialized software. Urban public transit authorities are an increasingly common user of vehicle tracking systems, particularly in large cities.

Furthermore, the VLA location module at Memory 150 may initiate an augmented reality module (AR/Image) (even through an AR module is not included in the figures) which may use the location data for overlaying augmented reality (AR/Image) data. Such an AR/Image module may be initiated by the VLA location module. The AR/Image module may continuously poll the VLA location module for location of the vehicle 105. Once a location and direction of the vehicle 105 are received by the AR/Image module, the AR/Image module may overlay relevant point of interest (POI) information over image data that may then be displayed on a display at vehicle 105. Augmented reality overlay is expected to include registration and tracking between the superimposed perceptions, sensations, information, data, and images and some portion of the real world. Some example may include, but not limited to, points of interest, navigation, vehicle information, etc. The display may include a screen, a hand help displays or mobile device screen, or a heads-up display (HUD).

The VLA AR/Image module may be initiated by the base module when the vehicle is accessed or when the vehicle 105 is powered on. The VLA AR/Image module may continuously poll optical sensors at vehicle 105 or on a stand-alone device that stores and runs the applications of the VLA device 140. Images from all-optical sensors may be stored in the image database of databases 155 as long as the vehicle 105 is running or while there is activity in vehicle 105.

Furthermore, the VLA AR/Image module may also initiate the operation of a face module, a gesture module, and/or a driver stress module. These modules may be initiated sequentially or maybe initiated in parallel even though they are not included in the figures as discrete software modules. Operation of the VLA AR/Image module may then end once the vehicle 105 is turned off or after there are no more persons within vehicle 105.

This face module may uses facial recognition to identify persons that are in the vehicle 105. This may allow VLA device 140 to identify if a driver is authorized to be operating vehicle 105. User facial recognition data is stored in the VLA user database of databases 155. This may allow the processor 140 facial recognition technologies to authorize the use of a vehicle 105. There may be multiple levels of users or drivers, for example, a temporary user could be a friend or a teenage son or daughter who needs the approval of a primary user to use the vehicle 105. Instructions of such a face module would prevent the theft of vehicle 105 as the vehicle 105 may not be allowed to operate if a person's face is not recognized.

Operation of a gesture module may be initiated by the AR/Image module. Processor 145 may execute instructions of the gesture module continuously while vehicle 105 is running. This may allow processor 145 to monitors acquired AR/Image data stored in the image database of databases 155 when user movements are analyzed for gestures from a user.

Gestures by a user can be recognized within AR/Image data and specific gestures can be used to control computing devices associated with the vehicle. Gesture recognition is a type of perceptual computing user interface that allows computers to capture and interpret human gestures as commands. The general definition of gesture recognition is the ability of a computer to understand gestures and execute commands based on those gestures.

Operation of a driver stress module may be initiated by the VLA AR/Image module when image data is continuously monitored and stored in the image database. A person's stress or emotional state can be determined by analyzing facial features, posture, and movements of a person in vehicle 105.

Operation of the VLA acoustic module may be initiated by the VLA base module at Memory 150 once the vehicle 105 is turned. The VLA acoustic monitor may continuously monitor the acoustics of vehicle 105 until the vehicle 105 is turned off. Instructions of the VLA acoustic module may allow processor 145 to monitor the acoustics of vehicle 105 in real-time. Processor 145 may then compares the real-time acoustics to data stored at an acoustic database. Such an acoustic database may store a baseline of what the vehicle 105 should sound like when running optimally as well as sounds that would relate to potential vehicle problems. For example, a knocking sound could be an engine problem, a clicking noise may be related to low oil, or a squeaking noise could be a brake or bearings issue. Since computers can analyze acoustic signatures outside the human hearing range, operation of the VLA acoustics module may allow processor 145 to identify potential issues and problems before they are audible to a human. Furthermore, using acoustic triangulation, even if a specific problem can't be identified, the general location of the acoustic signature can be identified to help guide maintenance workers to the possible problem. Specific sounds coming from vehicle 105 can be associated with specific problems. Acoustic signatures can be matched to a library of signatures.

Operation of the VLA context module at Memory 150 may be initiated by the VLA base module. This may allow processor 145 to continuously monitor VLA databases 155 new data that has been stored in the databases 155. Instructions of the VLA context module may allow processor 145 to compares new data found in the databases to data stored in a context database 148 to determine if there is a contextual event that requires a response. For example, weather data, historical query data, navigation data, vehicle diagnostics data, user calendar information, traffic information, etc. Methods consistent with the present disclosure may use contextual stimuli to provide a more custom response to the user rather than just a programmed response to a query. For example, a user may request directions to a specific location, processor 145 may identify based on contextual data, that the user should be asked or suggested to take an alternative route because of a potential safety or contextual issue identified by processor 145. In an instance when the vehicle has low tire pressure, contextual data associated with the low tire pressure may result in changing a route of the vehicle to include a stop at a service station to add air. Contextual data associated with an engine noise may result in a recommendation that the drive not drive on a highway or at speeds that exceed a speed (e.g. 35 miles per hour).

The VLA telematics database of databases 155 may store sets of telematics data collected by operation of instructions of the VLA telematics module. This telematics data may data include, but is not limited to, vehicle sensor data, driving habits data (such as acceleration and de-acceleration rates), vehicle maintenance records, and warranty information. The context database may store potential responses to user queries and additional contextual data required to generate such queries. For example, if a user asks for directions to a location, instead of just looking up a shortest route the, contextual data could be accessed when additional questions are generated such that a driver could be provided a best route considering contextual data that the driver is concerned with. The advice database of databases 155 may store advice that may be provided to a user for a specific situation. Specifically, the advice database of 155 may be used to provide suggested actions for a user based on their emotional state.

The VLA user database may store user information, including facial recognition data, an indication that identifies the face of a primary user or a secondary user. The VLA user database may also store information that identifies a temporary user. The VLA acoustic database may stores a variety of sounds related to the optimal operation of a vehicle as a baseline for comparison as well as acoustic signatures for known problems for identifying issues with a vehicle. The AR/Image database may stores all image data that the received based on operation of the instructions of the AR/Image module. As such all data sensed by an optical sensor or a camera may be stored.

Figure 2:
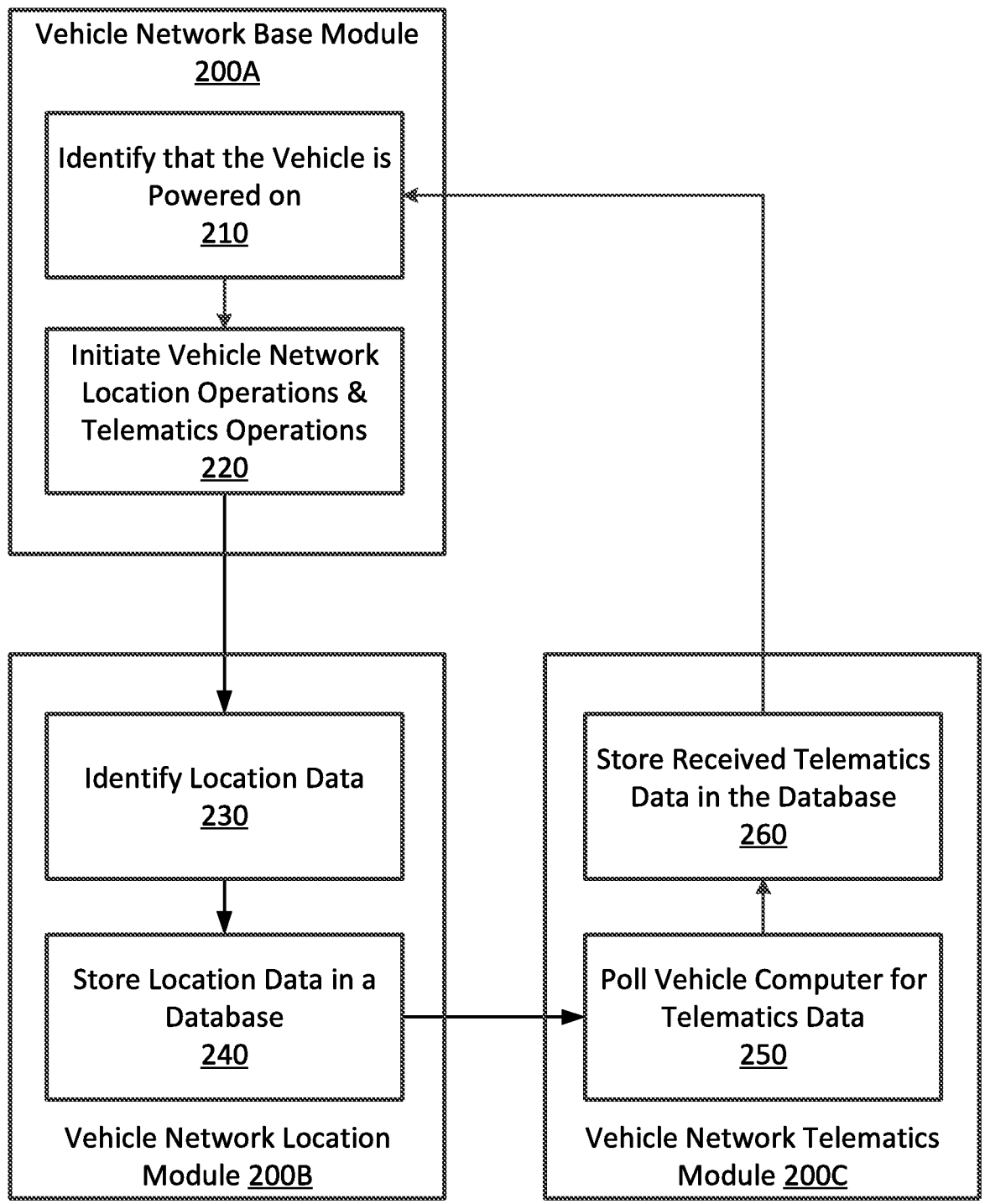
FIG. 2 illustrates steps that may be performed when a processor at a vehicle application network device monitors data collected by computing devices at a vehicle.

FIG. 2 illustrates steps that may be performed when a processor at a vehicle application network device monitors data collected by computing devices at a vehicle. The steps illustrated in FIG. 2 may be performed by processor 165 of the vehicle application network (VAN) device 160 when collecting information from processor 140 of vehicle location application 140 or from vehicle computer 125 of FIG. 1. FIG. 2 illustrates steps that may be performed by the VAN base software module 200A, the VAN location software module 200B, and the VAN telematics software module 200C. Each of these software modules 200A, 200B, and 200C may be stored in memory 170 of the VAN 160 device of FIG. 1 when processor 165 executes instructions out of memory 170. FIG. 2 begins with step 210 where the vehicle network (VAN) base module may identify that the vehicle is powered on. This step may include the VAN device 160 communicating with computer 125 via communication interface 110 at vehicle 105. Next in step 220 of FIG. 2, the VAN base module may initiate operations of a VAN location software module and the operation of a VAN telematics software module. After step 220, a location of the vehicle may be identified in step 230 and that step may be stored in a location database in step 240. Steps 220 and 240 of FIG. 2 may be performed by processor 165 at VAN device 160 of FIG. 1. The system may continuously check for a communication connection with the vehicle or it can continuously try to connect. While the vehicle is not in operation the vehicle's computer 125 may not be active. In another embodiment, the computer 125 may also identify whether the vehicle is moving, yet not on, as this would suggest the vehicle being towed or stolen via some means that does not require that the vehicle of not turning the vehicle on.

If the no communication can be established between the VAN device 160 and vehicle computer 125, the VAN device 160 may continue to poll for a connection or signal which would indicate the vehicle is on.

The VAN base module may also continue to monitor the vehicle to ensure that the vehicle is still running. Operation of the VAN location module 200B may begin with polling a vehicle computer for location data. This location data can come from any location sensor associated with the vehicle. Location data may include, but not limited, GPS location data, cellular triangulation, or by interpolating the position of the vehicle from available data. Vehicle location may be interpolated by identifying a direction of travel, a speed, an acceleration, and a time. As mentioned above, the vehicle location may be stored in the VAN database in step 240 of FIG. 2.

Next in step 250 of FIG. 2, a computer at the vehicle may be polled for telematics data and that data may be stored in the VAN database in step 260 of FIG. 2. Steps 250 and 260 of FIG. 2 may be operations associated with the VAN telematics module 200C of FIG. 2 or the VAN telematics module stored in memory 170 of the VAN device 160. The location data and the telematics data may be stored in a VAN database may be accessed after it has been received.

FIG. 2 displays the "VAN telematics module may begin polling a vehicle computer for telematics data. Telematics data can consist of any sensor or data related to the vehicle. Types of telematics data are well known in the art and may consist of but not limited to, tire pressure data, fuel data, fuel levels, fuel consumption, acceleration rates, de-acceleration rates, diagnostic codes, engine temperatures, and other sensor data. The telematics data may is then stored in the VAN database in step 260 as discussed above. The telematics data stored in the VAN database may be used by other applications. Telematics data may be analyzed to identify or classify the behavior of a driver.

Once the data has been stored in the VAN database the vehicle computer may be polled in step 210 of FIG. 2 to ensure that the vehicle is still on or running. If the vehicle is still on or running the vehicle computer may be continuously polled for location and telematics data. If the vehicle is off or no longer running the program operations may stop.

Table 1 illustrates data that may be stored in a VAN database after location and telematics data has been received from a vehicle computer. The VAN database stored data of table 1 includes times, locations, directions, tire pressure, engine temperature, fuel levels, an amount of instantaneous acceleration or deceleration, fuel consumption, and a vehicle speed. The location data may identify a latitude and a longitude. Note that table 1 identifies different sets of data that were collected at 1:00 PM, 1:05 PM, and 1:10 PM. Data stored in the VAN database may be collected at discrete time intervals, may be collected when certain types of events occur (e.g. moments of high acceleration or deceleration), or both. Note that at 1:00 PM the vehicle was located at a location of 44.04/−72.71, when the vehicle was traveling in a South East (SE) direction. At this time the tire pressure was 35 pounds per square inch (PSI), the fuel level was 10 gallons, the vehicle was accelerating at a measure of 1, the fuel consumption was 0.01, and the vehicle speed was 35 miles per hour (MPH). Once stored at the VAN database this data may be provided to other applications use. For example, a third party may use the data to analyze user driving behavior. While not illustrated in table 1, collected data may be overlaid with road information when behavior of a driver is analyzed. By overlaying such information, a third party may be able to identify that the driver was driving at an excessive speed on local streets and such a finding could result in a warning being sent to the driver or to a supervisor of the driver.

TABLE 1

Vehicle Application Network Database Data

| Time | 1:00 PM | 1:05 PM | 1:10 PM |
|---|---|---|---|
| Location | 44.04/−72.71 | 44.54/−72.21 | 44.64/−71.81 |
| Direction | SE | S | SW |
| Tire Pressure | 35 PSI | 37 PSI | 37 PSI |
| Engine Temperature | 175 F. | 197 F. | 197 F. |
| Fuel Level-Gallons | 10 | 9.97 | 9.94 |
| Acceleration-Deceleration | 1 | −1 | 25 |
| Fuel Consumption | 0.01 | 0.01 | 0.05 |
| Speed | 35 MPH | 35 MPH | 80 MPH |

Figure 3:
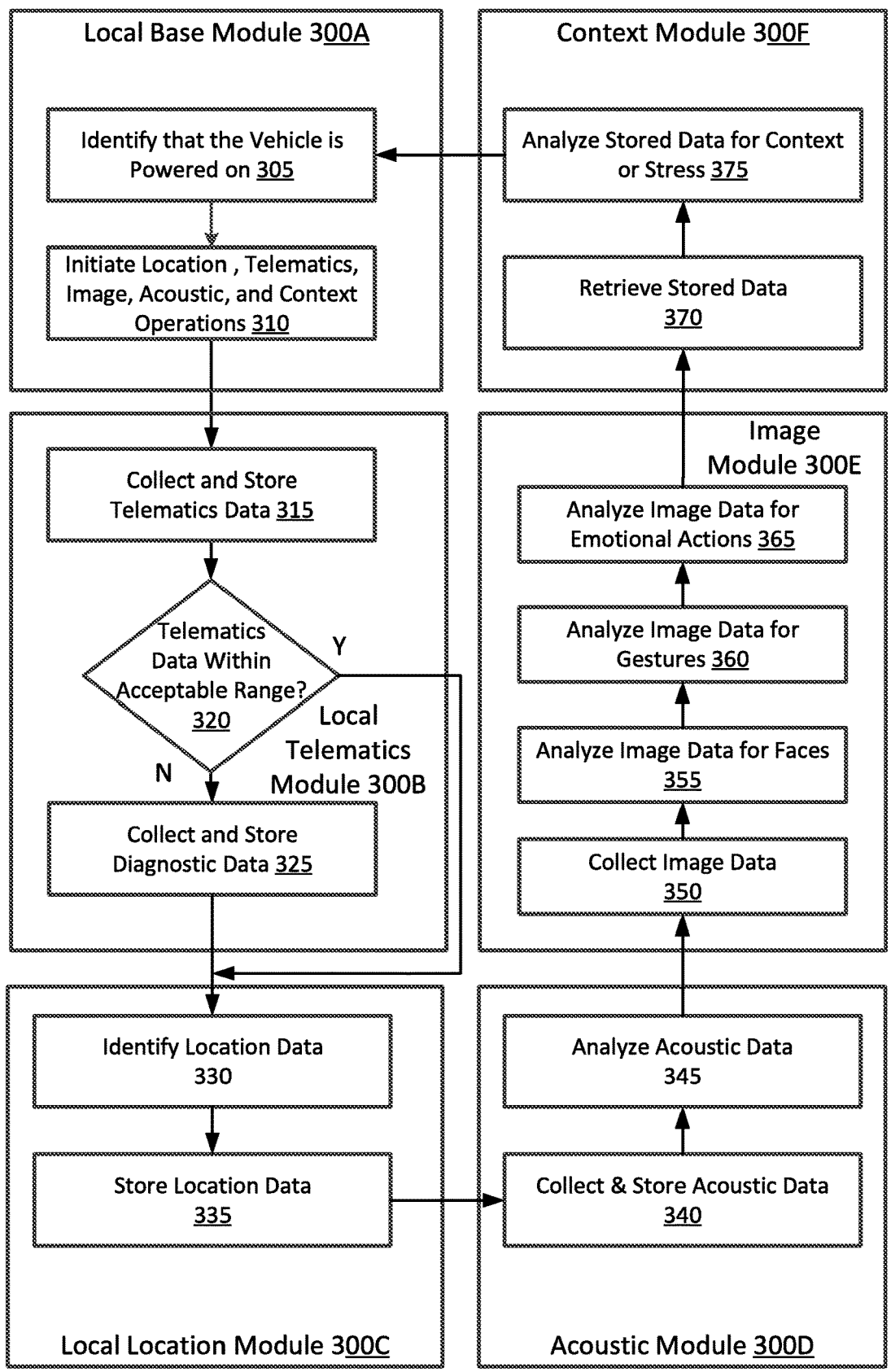
FIG. 3 illustrates operations that may be performed when instructions of several different software modules are executed by a processor that directly monitors data collected at a vehicle.

FIG. 3 illustrates operations that may be performed when instructions of several different software modules are executed by a processor that directly monitors data collected at a vehicle. Operations performed in FIG. 3 may be performed by processor 145 of the vehicle location application (VLA) device 140 of FIG. 1. While the operations of FIG. 1 are illustrated as being implemented by instructions of a local base module 300A, a local telematics module 300B, a local location module 300C, an acoustic module 300D, an image module 300E, and a context module 300F these functions may be performed using fewer or more software modules. FIG. 3 illustrates steps 305 and 310 being performed by the execution of instructions associated with local base module 300A. Step 305 identifies that the vehicle is powered on and operations of a location software module, a software telematics module, an image software module, an acoustic software module, and a context module are initiated.

The various modules illustrated in FIG. 3 may be referred to as a VLA base module, a VLA telematics module, a VLA location module, a VLA acoustic module, a VLA AR/Image module, and a VLA context module. These software modules may instructions that when executed perform the same functions as the modules stored in memory 150 of the VLA device 140 of FIG. 1.

This diagnosis data may be stored in a different table within a local telematics database. When a diagnosis is located within the local telematics database an alert may be sent to a display either within the vehicle or to a standalone display on a device in step 325 of FIG. 3. In certain instances, this information may be sent to a user mobile device at step 325. The diagnosis may also be sent to the context software module. Operations of the context module may identify whether actions need to be taken based on contextual data. In another embodiment, if an issue is detected, for example, the engine temperature reaches a critical temperature, the driver or user can be directed to a safe emergency stop to avoid damaging the engine. The VLA telematics module may then polls the vehicle to see if the vehicle is still on or running. When determination step 320 identifies that the telematics data 320 is within an acceptable range of after step 325, program flow may move to perform steps associated with the local location (or VLA location) module. When the current telematics data is outside normal operating parameters the telematics database may be polled again for a potential diagnosis based on which parameters are outside the normal operating parameters. The process of initiating the telematics module may begin with polling of vehicle computer for telematics data. This polling may result in steps 315, 320, and 325 associated with the local (or VLA) telematics module 300B may be performed after step 310 of FIG. 3. Step 315 collects and stores vehicle telematics data. Telematics data may consist of any sensor or other vehicle-related data that can be polled and collect including, but not limited to, tire pressure, engine temperature, cylinder pressures, fuel levels, speed, etc. The telematics data may be stored in the Telematics database of the databases 155 of FIG. 1. The data that is most recently stored in the telematics database may then be compared with normal operating data and ranges for the vehicle. Determination step 320 of FIG. 3 may identify whether the telematics data is within an acceptable range, when no program flow may move to step 325, where diagnostic data may be collected and stored.

After operation of the local (or VLA) location module is initiated a location of the vehicle may be identified in step 330 and that location may be stored in the telematics database in step 335 of FIG. 3. The location data may have been identified using any sensor or device attached or associated with the vehicle. For example, a GPS device, a tracking system of a mobile phone, or some other integrated tracking system may have identified the vehicle location. Such a vehicle tracking system may combine the use of automatic vehicle location in individual vehicles with software that collects fleet data for a comprehensive picture of vehicle locations. Modern vehicle tracking systems commonly use GPS or GLONASS technology for locating the vehicle, yet other types of automatic vehicle location technology may also be used.

Once the most recent location data has been stored, the VLA location module may identify whether the vehicle is still running or in use. Once the vehicle is no longer on or running there may be no further purpose to collect location data as the vehicle is not moving.

While not illustrated in FIG. 3, operation of the VLA or local location module may include instructions that provide augmented reality (AR) functionality and this AR functionality may be implemented by yet another sub module that may be referred to as an AR software module.

Functions of the AR module may include polling the local telematics database for most recent location data of the vehicle. This data may include a location and a direction the vehicle. The location and direction may be used to orient data that may be overlaid a display of the vehicle or of an associated device. This process may include accessing image data for the most recent image that may be included in the display of overlaid information. The telematics database may then be polled again for recent information about the vehicle including, but not limited vehicle speed, directional information, sensor data, diagnostic information or identified issues. The context database of the databases 155 of FIG. 1 may be accessed for relevant contextual data that could be overlaid on the displayed image. This contextual data may include, yet is not limited to, weather data, user history information, points of interest, etc. The acoustic database of the databases 155 may also be accessed to retrieve any recent relevant acoustics data or results. This retrieved acoustic data may also be overlaid the display. For example, if a problem is detected based on acoustics data the alert can be overlaid on the display. This process may include showing the location of the acoustic signature on the display. The image data and location data may be analyzed and correlated to make sure that the image and location data are synchronized. This ensures that when other data is overlaid on the image and display it is correctly aligned to provide a correct view of data on the image. Correlating and aligning location data with images from an optical sensor or devices is well known in for use in augmented reality.

Once image data and the location/directional data are aligned, other polled data can be overlaid. The processing of overlaying data on to an image or display is well known in the art and can be done as long as the overlaid data has geospatial information associated with it. For example, a point of interest such as a restaurant has a known location and that location can be overlaid on to and image on a display based the location and direction of the image versus the location and direction of the point of interest from the display. The vehicle may then be polled to see if it is still on or running.

After step 335 of FIG. 3, program flow may move to performing steps 340 and 345 of acoustic or VLA acoustic module 300D. Acoustic data may be collected and stored in step 340 after which that acoustic data may be analyzed. Functions performed when the received acoustic data is analyzed is illustrated in FIG. 8.

Figure 4:
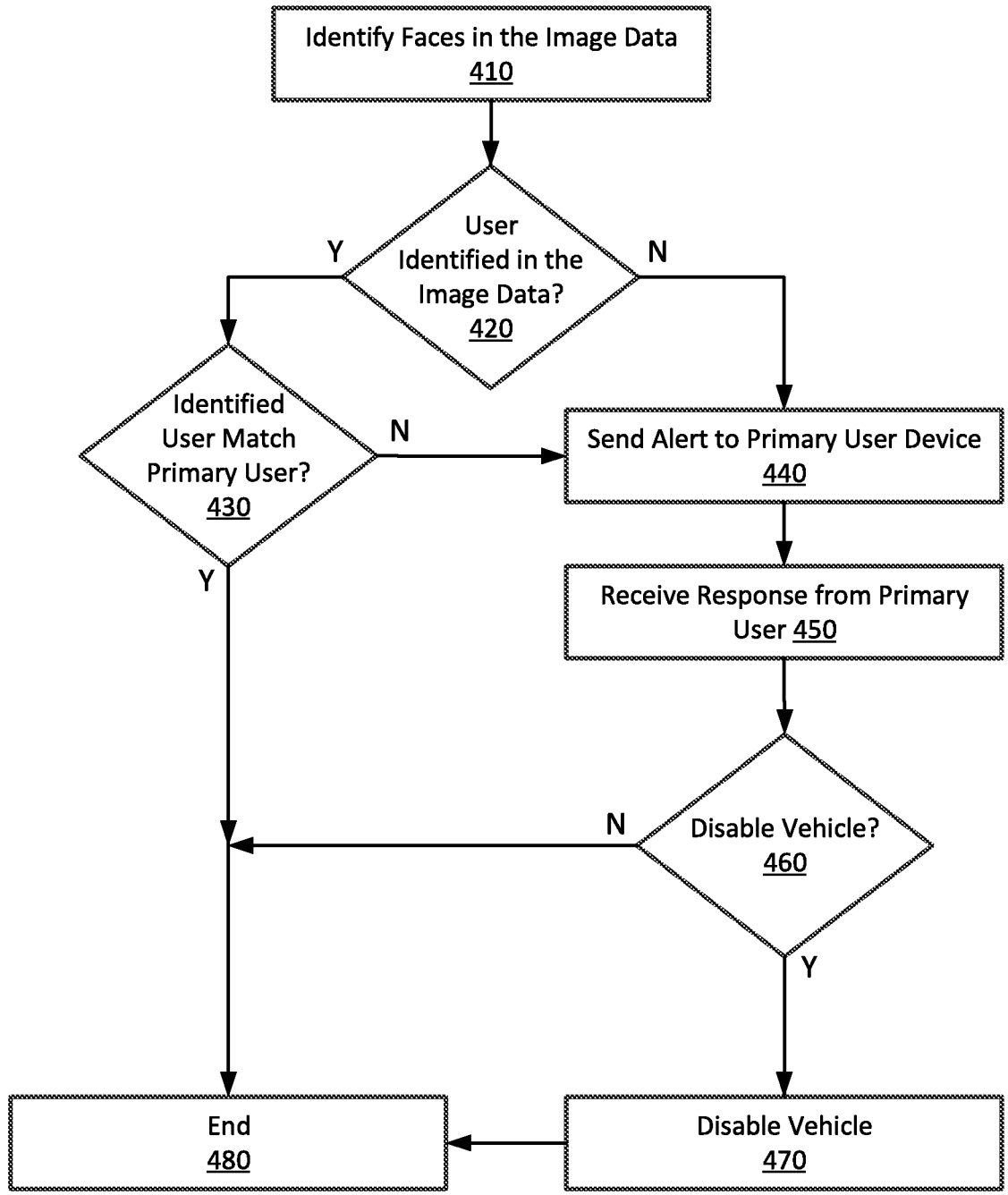
FIG. 4 illustrates steps that may be performed when the image data is analyzed to recognize faces of people.
Figure 5:
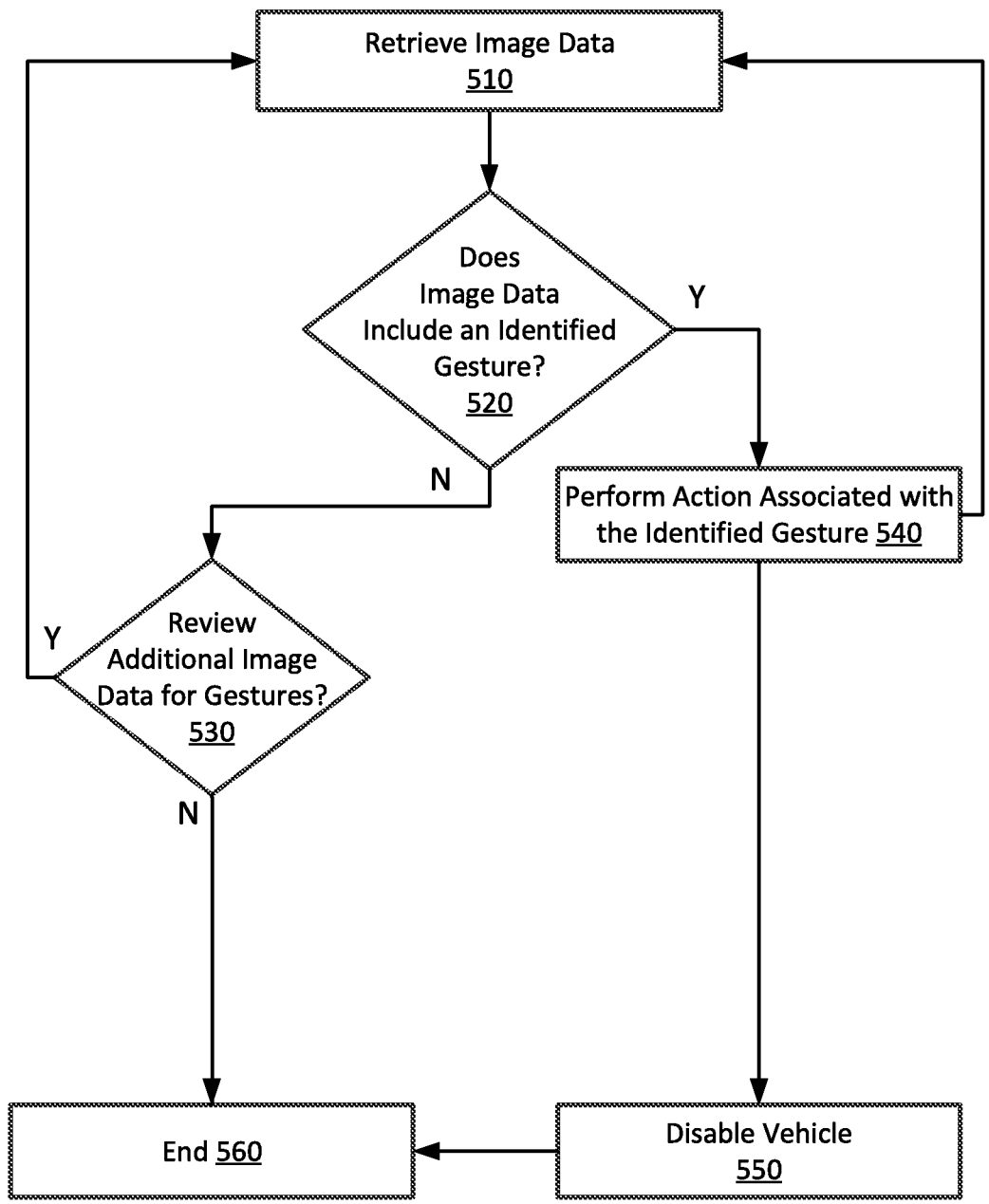
FIG. 5 illustrates steps that may be performed when acquired image data is analyzed to identify gestures that may be related to an action or command from a person in a vehicle.
Figure 6:
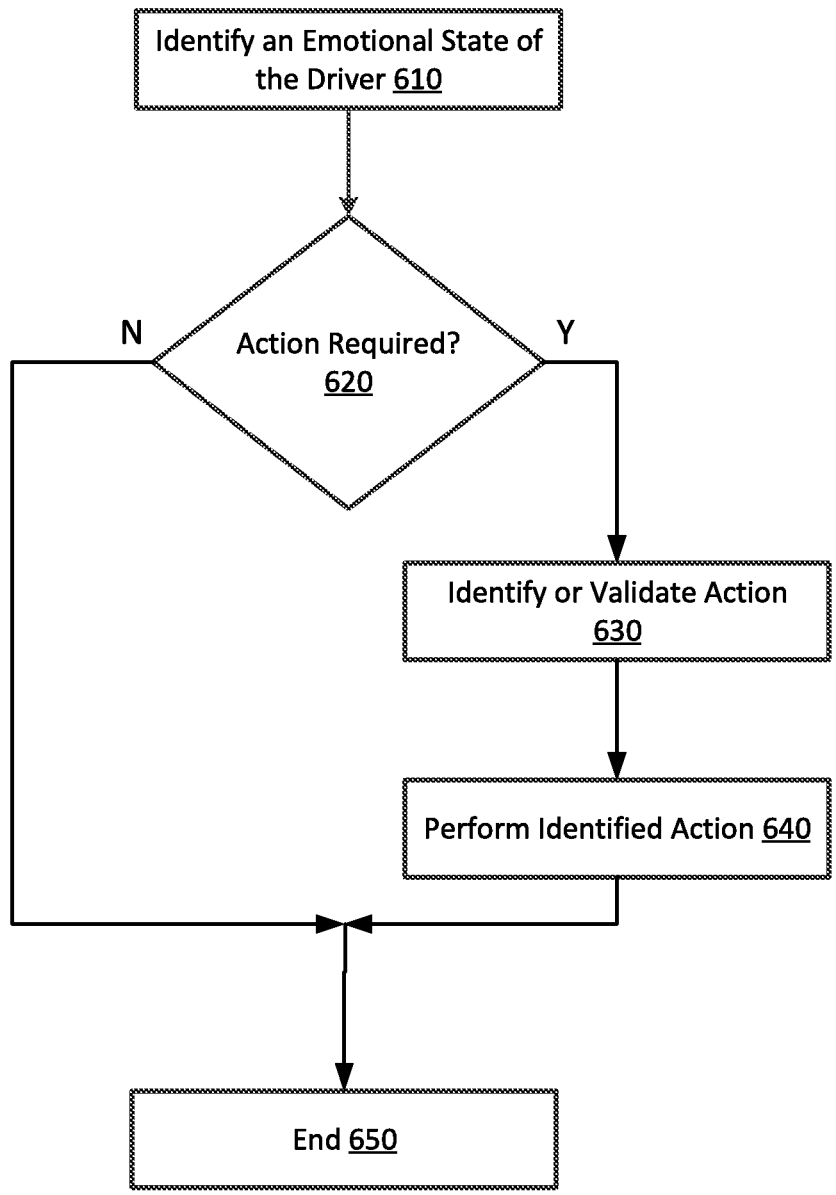
FIG. 6 illustrates actions that may be performed when an emotional state or a stress level of a driver is identified from image data.

After step 345, program flow may move to steps of the image module 300E of FIG. 3. Step 350 of FIG. 3 collects image data after which that image data is analyzed to identify faces in step 355. Acquired image data may be analyzed to identify gestures in step 360 of FIG. 3 and then this data may be analyzed for emotional actions performed by a driver in step 365 of FIG. 3. FIGS. 4, 5, and 6 review steps that may be performed when the image data is reviewed to identify faces, to identify gestures, and to identify driver emotional actions or to identify that the driver is under stress.

After step 365 of FIG. 3, program flow may move to performing actions associated with the contextual module 300F of FIG. 3. Step 370 of FIG. 3 may retrieve stored data such that that data may be analyzed for a context in step 375 of FIG. 3. Steps that may be included in the analysis and identification of a context are shown in FIG. 8.

The image data received in FIG. 3 may be received from at least one optical sensor and this received data may them be stored in an image database, such as the image database of the databases 155 of FIG. 1. The storage of this image may allow other software modules to access image data as needed.

FIG. 4 illustrates steps that may be performed when the image data is analyzed to recognize faces of people. This process may begin with the polling of the image database to retrieve the most recent image data. The image data will be used to identify persons entering and using the vehicle. Faces included in the image data may be identified using facial recognition in step 410 of FIG. 1. Determination step 420 may then identify whether a faces in the image data belong to a known user or a registered user of the vehicle, when yes program flow may move to determination step 430 that identifies whether the face of a primary user is included in the image data. When determination step 430 identifies that the face of a primary user has been identified, operations of FIG. 4 may end in step 480.

When determination step 420 identifies that the image data does not include a face of a known or registered user, program flow may move from step 420 to step 440. Program flow may also move to step 440 when determination step 430 identifies that an identified user is not the primary user. An alert may then be sent to a computing device of the primary user in step 440 to inform the primary user that individuals other than the primary user are attempting to access or use the vehicle.

After the primary user has been sent the alert, a response may be received from the computing device of the primary user. This response may include an indication to allow these other individuals to access or use the vehicle or may identify that the vehicle should be disabled. For example, if an unauthorized person attempts to enter the vehicle to steal it, the owner of the vehicle would be notified and the owner could disable the vehicle. Additionally, access to a vehicle could be controlled for "temporary users" or other known users such as teenagers or friends borrowing your vehicle. When determination step 460 identifies that the response from the primary user indicates that the vehicle should be disabled, program flow may move to step 470 where the vehicle is disabled. The disabling of the vehicle may be performed by sending a special code to a computer at the vehicle that does not allow the vehicle to be accessed. Such an action may also result in the police being called. After step 470 or when determination step 460 identifies that the vehicle can be accessed or used by the other individuals, the flow chart of FIG. 4 may end at step 480.

An analyzed face or faces from the image data may then be identified by comparing acquired facial data with data stored in a user database. Since each person has unique facial features, facial recognition functions performed in FIG. 4 may include mapping certain points on a person's face. Measurements and positions o points in these mappings may be used to create a unique "fingerprint" that may be used to identify particular individuals.

In another embodiment, a temporary user may be assigned designated times and dates preprogrammed into their profile stored on the user database. These designated times and dates may identify when the temporary user could use the vehicle without sending a message to the primary.

FIG. 5 illustrates steps that may be performed when acquired image data is analyzed to identify gestures that may be related to an action or command from a person in a vehicle. This process begins with step 510 where image data is received from a camera or is retrieved from the image database. The image data is then analyzed to identify whether a user has provided a gesture in determination step

520. For example a movement of the hand positon of the user may be interpreted as a gesture. When a gesture is not present in the image data program flow may move from step 520 to determination step 530 that may identify whether additional image data should be reviewed for gestures.

When determination step 520 identifies that the image data include a gesture program flow may move to step 540 where an action associated with the gesture may be performed. After step 540 program flow may move to either step 550 or step 510. Program flow may move to step 550 in an instance when the action corresponds to disabling the vehicle after which the vehicle will be disabled in step 550. This may help driver whose vehicle has been carjacked by a perpetrator. In such an instance, the perpetrator would not be aware of the fact that the driver commanded to vehicle to be disabled and this may lead to perpetrator leaving the vehicle. When program flow moves to step 510 after step 540, additional image data may be retrieved for gesture analysis after the action is performed.

When step 530 identifies that additional image data should be reviewed for gestures, program flow may move to step 510 where additional image data may be retrieved for gesture analysis. When step 530 identifies that additional data should not be retrieved or after step 550, operations of the flow chart of FIG. 5 may end at step 560. In certain instances, a user may elect to assign or create custom gestures to specific functions. These customizations could be stored along with the other user information in the user database. For example a user could program that the vehicle should be disabled when provided with a left hand salute.

Other exemplary gestures may include a user moving their open hand from a distance closer to optical sensor to a distance farther away or moving their figures from being close together to farther away, such gestures may represent zooming in on content displayed on a display. As such various gestures may be associated different commends or actions and once a gesture is identified a corresponding action may be performed.

FIG. 6 illustrates actions that may be performed when an emotional state or a stress level of a driver is identified from image data. The process analyzing image data for an emotional state or stress level may begin with the Driver Stress Module polling the image database for the most recent image data to analyze. Image data can be used to determine a user's emotional state or stress level by monitoring different attributes of the user such as eye movement, head movement, blinking, general expression, posture, gestures, etc. This process may also include analyzing the image data quickly to determine if the driver is even present in the vehicle. When there is no one in the image there is no reason to do any further analysis.

When the driver is present, the image data is then analyzed to determine the user's emotional state in step 610 of FIG. 6. This process may include for example, tracking driver eye movement, posture, and facial expression, especially a person's brow. This process may also include identifying whether that driver is shaking his fist, is shouting, or is making other emotional movements. This data may then be used to identify a level of stress. Additionally a breathing rate and how heavy the driver is breathing may also be used to identify a stress level.

Once the driver's emotional state or stress level is determined, determination step 620 may access an advice database to identify an action that can be taken to help a driver reduce stress in step 620. For example, a moderate stress level may prompt the user to take a few deep breaths or calming music may be played automatically. Whereas a more extreme level of stress may prompt a complete change in the navigation to a less congested traffic area, other suggestions may be provided to the driver. Such a recommendation may include recommending that the driver stop somewhere and rest for a few minutes. In other instances, certain actions the driver can take in the vehicle may be limited.

When the user's emotional state doesn't require any action program flow may move to step 650 where the flow chart of FIG. 6 may end. When an action is required, that action may be identified in step 630 and then be performed in step 640 of FIG. 6. After step 640 the flow chart of FIG. 6 may end.

Figure 7:
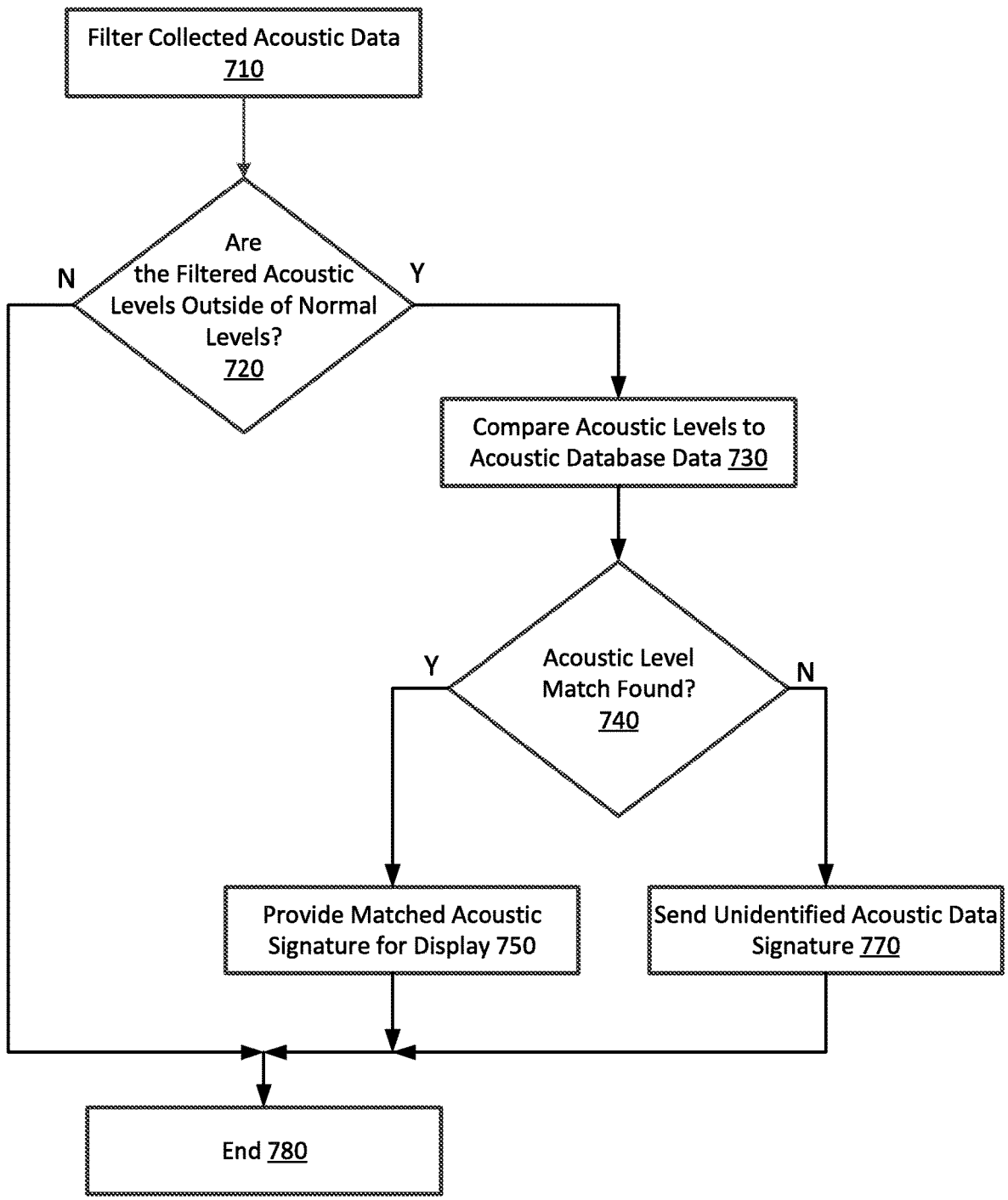
FIG. 7 illustrates steps that may be performed when an analysis of sounds or acoustics associated with a vehicle is performed.

FIG. 7 illustrates steps that may be performed when an analysis of sounds or acoustics associated with a vehicle is performed. This process may begin with the polling acoustic sensors associated with a vehicle or a device associated with the vehicle. An associated device could be a user's smartphone or a similar standalone device. The acoustics data may then have been stored in an acoustic. Step 710 of FIG. 7 may filter acoustic data to remove background noise. Next determination step 720 may identify whether levels of the filtered acoustic data are outside of a normal level. This may include comparing the filtered acoustic data to acoustic data stored in the acoustic database which may correspond to normal acoustic levels or signatures associated with a vehicle that is operating normally. If the new acoustic data is within the normal operating acoustic levels, no action may be taken and program flow may move to step 780 where operations of FIG. 7 end.

When the acoustic data is outside a normal acoustic level, then an abnormal acoustic signature or the acoustic data itself may be analyzed in step 730 of FIG. 7. An out of range acoustic data may be compared to a library of known acoustic problem data or signatures. For example, a specific squeaking sound could be associated with a specific issue with a vehicle, such as a low level of power steering fluid, so if that squeak is heard again, the problem can be identified. The abnormal acoustic signature may be compared to a library stored in the acoustics database to determine if there is a match. If there is no match for the abnormal acoustic signature, a default message may be sent to the display notifying the user of the vehicle that an abnormal noise had been detected but it can't be identified in step 750. If the abnormal acoustic signature is matched with an acoustic signature in the acoustic database, the identified issue may be sent to the display along with suggested actions to remedy this issue at step 770. Once the unidentified message or identified issues message is sent to the display, the vehicle is polled to determine if it is still running. If the vehicle is still running, the acoustic sensor are polled for the most recent data again. If the vehicle is no longer running the flow chart of FIG. 7 may end at step 780.

FIG. 8 includes steps that may be performed with collected contextual information is analyzed. The process may begin a processor executing instructions of the with the VLA context module polling all of the databases 155 of in the vehicle local application device 140 of FIG. 1 for new or most recent data in step. The new or recent data is then extracted from each of the databases at step 810 of FIG. 8. This extracted data is then compared to other data stored at the context database accessible to a VLA device in step 820 of FIG. 8 to find the closest correlation of possible contextual events that match the data points in. For example, the context database may store a list of any number of possible events. With each possible event, there is any number of associated and relevant data points. Furthermore, there may be a specific action associated with each contextual event in the context database. Consider a scenario where the new telematics data suggests an increase in engine temperature, acoustic data confirms an engine issue and the driver's stress level is high. From a contextual perspective, it may be inferred that there is a major issue with the vehicle and the driver is aware of it and this knowledge is likely stressing the driver out. When these data points are compared to the context database the action could reroute the vehicle to a closest service station automatically.

Determination step 830 may identify whether the new data match other data stored at the contextual database. When determination step 830 identifies that there is a match, program flow may move to step 840 of FIG. 8. In some cases, there may not be a direct match to a contextual event, so events may be scored based on how well they correlate to the current data. As such program flow may move to step 840 when the new data correlates to the data stored at the contextual database within a threshold level. Once the best contextual event is identified, a suggested action may be identified in step 840. The identified action may then be performed in step 850. This action may include sending a recommendation to a user via display or via speaker. The user may agree or dismiss the recommendation. If the recommendation is accepted by the user, a subsequent action may then be performed. If the recommendation was dismissed it could be due to the fact that the recommendation was not the right one for a current context, so the system could then send a next best recommendation to the driver.

Either after step 850 or when determination step 830 identifies that the new data did not match other contextual data, program flow may move to step 860, where the flow chart of FIG. 8 ends.

Functioning of the "Local Telematics Database" will now be explained with reference to FIG. 1. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Table 2 illustrates data that may be stored in a telematics database consistent with the present disclosure. This data may have been collected by the operation of instructions of the VLA telematics module previously discussed. The data stored may include, yet is not limited tool vehicle sensor data such as time, pressure and temperatures, location data, direction, speed, acceleration or de-acceleration rates, fuel levels, fuel consumption rate, and vehicle diagnostic information. Furthermore, VLA Local Telematics Database stores the entire baseline or normal ranges for a vehicle operating at normally. The baseline or normal ranges are used to determine if data from the vehicle is outside normal ranges.

TABLE 2

Telematics Database Data

| Time | 1:00 PM | 1:05 PM | 1:10 PM |
|---|---|---|---|
| Tire Pressure | 35 PSI | 37 PSI | 36 PSI |
| Engine Temperature | 197 | 197 | 197 |
| Fuel Level- Percentage | 50.01 | 50 | 49.98 |
| Fuel Consumption | 25 | 30 | 20 |
| Acceleration- Deceleration | 5 | 0 | 6 |
| Speed | 25 MPH | 40 MPH | 80 MPH |
| Oil Pressure | 17 PSI | 17 PSI | 17 PSI |
| Engine Pressure | 25 PSI | 49 PSI | 25 PSI |
| GPS Location | 11.234:43567 | 11.238 L 43,568 | 11.242:43.571 |
| Direction | N | NNE | N |

Table 3 illustrates data that may be stored in a contextual database. Table 3 may store information relating to any number of possible contextual events that could occur and associated with the events are a plurality of data points and a suggested action. The contextual event may include but not limited to, any type of vehicle issue, need for maintenance, fuel, or the state of the driver, for example, as the driver been driving too long without a break, etc. A possible data point may include but not limited to any telematics data, location data, image data, driver emotional state data, etc. Furthermore, the action in many cases may be a suggestion to the driver regarding what they should do but, in some embodiments, an automated action could be executed without user interaction. The data in table 2 identifies that certain sets of contextual information, e.g. a high engine temperature may correspond to an identified noise and a high driver stress level. Note also that other a driver experiencing moderate stress in high traffic conditions should be provided with calming music and that a driver experiencing high stress in high traffic conditions should be provided with an alternate route.

TABLE 3

Contextual Database Data

| Contextual Event | Serious Vehicle Issue | Minor Vehicle Issue | Critical Vehicle Issue | Moderate Stress | High Stress |
|---|---|---|---|---|---|
| Telematics Data | Engine Temp Above 200 F. | Tire Pressure Low | Fuel Level Less than 1% | Moderate Acceleration and Braking | Hard Acceleration and Braking |
| Driver Stress Data | Moderate Stress | Not Applicable | Not Available | Moderate Stress | High Stress |
| Image Data | Not Available | Not Applicable | Not Available | Not Available | Not Available |
| Acoustic Data | Engine Issue Identified | Not Applicable | Not Available | Not Available | Not Available |
| Traffic Data | Not Available | High Traffic | Low Traffic | High Traffic | High Traffic |

TABLE 3-continued

Contextual Database Data

| Contextual Event | Serious Vehicle Issue | Minor Vehicle Issue | Critical Vehicle Issue | Moderate Stress | High Stress |
|---|---|---|---|---|---|
| Action | Reroute to Service Station | Suggest Stopping to add Air to Tires | Reroute to Service Station | Turn on Calming Music | Suggest Route with Less Traffic |

A user database consistent with the present disclosure may be stored in a table that cross-reference a user name with a type of user and with a file that includes facial recognition data or with a file that include voice recognition data. This data may identify that John and Jane Smith are both primary drivers and that Sara Smith and Marko Evans are temporary drivers. This data may be used to identify the user by using facial or voice recognition. This data may also be accessed when a person enters a vehicle and it may be used to identify whether an alert should be sent to a computing device when identifying whether the person entering the vehicle should be allowed to access or use the vehicle.

Table 4 illustrates exemplary data that may be stored in an acoustic database. The acoustic database may store different types of data, a first type of data associated with the current acoustic data collected from a vehicle. Some of this collected data may be associated with normal vehicle noises for which no action is required. Other data stored in the acoustic database may be associated with a detected vehicle issue that should result in a recommendation that the driver drive to a service station. A second type of data that maybe stored in the database may be associated with noises of known problems that a vehicle may experience. Each of the items in table 4 are also associated with a recording of acoustic data (acoustic1.dat through acoustic 7.dat). Acoustic data of these known problems may be stored in the acoustic database such that a VLA device may identify a braking or other issue based on a noise that someday may recorded at the vehicle. A noise of a vehicle that sufficiently matches library problem acoustic data may be used to identify a particular problem that subsequently develops at the vehicle.

An image database of the present disclosure may store image data collected from a sensor or database. The data is used for any number of purposes including facial recognition, driver stress levels, etc. This image may also be used for insurance or accident fault identification.

TABLE 4

Acoustic Database Data

| Date/Time | Description | Action | Acoustic Data File |
|---|---|---|---|
| 7/1/2020 1:00 | Normal | Nothing | Acoustic1.dat |
| 7/5/20209 1:00 | Normal | Nothing | Acoustic2.dat |
| 7/10/2020 1:00 | Issue Detected | Route to Service Station | Acoustic3.dat |
| Acoustic Library | Brake Issue | | Acoustic4.dat |
| Acoustic Library | Bearing Issue | | Acoustic5.dat |
| Acoustic Library | Low Oil | | Acoustic6.dat |
| Acoustic Library | Suspension Issue | | Acoustic7.dat |

FIG. 9 illustrates a computing system that may be used to implement an embodiment of the present invention. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, peripheral devices 980, and network interface 995.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a FLASH memory, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), a plasma display, an organic light-emitting diode (OLED) display, an electronic ink display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem or a router.

Network interface 995 may include any form of computer interface of a computer, whether that be a wired network or a wireless interface. As such, network interface 995 may be an Ethernet network interface, a BlueTooth™ wireless interface, an 802.11 interface, or a cellular phone interface.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 900 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for operation of a vehicle responsive to collected sensor information, the method comprising:
activating an optical sensor within the vehicle to collect facial data of a person upon entry of the person into the vehicle;
identifying, based on a comparison of the facial data of the person received from the optical sensor to stored identification data for a plurality of users, that the facial data matches a particular user of the plurality of users, wherein the stored identification data for the plurality of users is maintained in a database communicatively coupled to the optical sensor, wherein the database divides the plurality of users between a primary user level and a secondary user level, wherein the primary user level is associated with authorization to use the vehicle, wherein the secondary user level is associated with lack of authorization to use the vehicle unless use of the vehicle is authorized by the primary user level;
identifying, based on the database, that the particular user belongs to the secondary user level and does not belong to the primary user level;
sending a message to an electronic device associated with a primary user of the vehicle, wherein the primary user belongs to the primary user level as identified in the database, the electronic message identifying an identity of the particular user based on the facial data of the person collected from the optical sensor within the vehicle and indicating that the person within the vehicle is attempting to use the vehicle;
receiving a response from the electronic device associated with the primary user, wherein the response indicates that the primary user temporary authorizes the particular user to use the vehicle and identifies a time limitation and a location limitation for use of the vehicle by the particular user;
storing data in the database that identifies that the particular user is the person within the vehicle and has a temporary status of a temporary user who is temporarily authorized to use the vehicle in accordance with the time limitation and the location limitation; and
temporarily authorizing the person within the vehicle to temporarily use the vehicle while temporary use of the vehicle by the person complies with the time limitation and the location limitation stored in the database.

2. The method of claim 1, further comprising:
receiving gesture information indicative of a gesture performed by the person in the vehicle from the optical sensor within the vehicle; and
causing a device within the vehicle to perform an action that corresponds to the gesture.

3. The method of claim 2, wherein the action is a zoom function, wherein the device within the vehicle includes a display, and wherein causing the device within the vehicle to perform the action includes using the zoom function to cause visual data to change from being displayed using the display at a first zoom level to being displayed using the display at a second zoom level in response to the gesture.

4. The method of claim 1, further comprising:
identifying a stress level of the person within the vehicle based on additional image data collected by the optical sensor; and
affecting a function of the vehicle to based on the stress level.

5. The method of claim 4, wherein the function is associated with operationality of the vehicle, wherein affecting the function of the vehicle based on the stress level includes temporarily terminating operationality of the vehicle while the stress level exceeds a specified stress level until the stress level of the person returns below the specified stress level.

6. A non-transitory computer-readable storage medium having embodied thereon a program executable by a processor for implementing a method for operation of a vehicle responsive to collected sensor information, the method comprising:

activating an optical sensor within the vehicle to collect facial data of a person upon entry of the person into the vehicle;

identifying, based on a comparison of the facial data of the person received from the optical sensor to stored identification data for a plurality of users, that the facial data matches a particular user of the plurality of users, wherein the stored identification data for the plurality of users is maintained in a database communicatively coupled to the optical sensor, wherein the database divides the plurality of users between a primary user level and a secondary user level, wherein the primary user level is associated with authorization to use the vehicle, wherein the secondary user level is associated with lack of authorization to use the vehicle unless use of the vehicle is authorized by the primary user level;

identifying, based on the database, that the particular user belongs to the secondary user level and does not belong to the primary user level;

sending a message to an electronic device associated with a primary user of the vehicle, wherein the primary user belongs to the primary user level as identified in the database, the message identifying an identity of the particular user based on the facial data of the person collected from the optical sensor within the vehicle and indicating that the person within the vehicle is attempting to use the vehicle;

receiving a response from the electronic device associated with the primary user, wherein the response indicates that the primary user temporary authorizes the particular user to use the vehicle and identifies a time limitation and a location limitation for use of the vehicle by the particular user;

storing data in the database that identifies that the particular user is the person within the vehicle and has a temporary status of a temporary user who is temporarily authorized to use the vehicle in accordance with the time limitation and the location limitation; and temporarily authorizing the person within the vehicle to temporarily use the vehicle while temporary use of the vehicle by the person complies with the time limitation and the location limitation stored in the database.

7. The non-transitory computer-readable storage medium of claim 6, the method further comprising:

receiving gesture information indicative of a gesture performed by the person in the vehicle from the optical sensor within the vehicle; and causing a device within the vehicle to perform an action that corresponds to the gesture.

8. The non-transitory computer-readable storage medium of claim 7, wherein the action is a zoom function, wherein the device within the vehicle includes a display, and wherein causing the device within the vehicle to perform the action includes using the zoom function to cause visual data to change from being displayed using the display at a first zoom level to being displayed using the display at a second zoom level in response to the gesture.

9. The non-transitory computer-readable storage medium of claim 6, the method further comprising:

identifying a stress level of the person within the vehicle based on additional image data collected by the optical sensor; and affecting a function of the vehicle based on the stress level.

10. The non-transitory computer-readable storage medium of claim 9, wherein the function is associated with operationality of the vehicle, wherein affecting the function of the vehicle based on the stress level includes temporarily terminating operationality of the vehicle while the stress level exceeds a specified stress level until the stress level of the person returns below the specified stress level.

11. A system for operation of a vehicle responsive to collected sensor information, the system comprising:

at least one memory; and at least one processor, wherein execution of instructions stored in the at least one memory by the at least one processor causes the at least one processor to:

activate an optical sensor within the vehicle to collect facial data of a person upon entry of the person into the vehicle;

identify, based on a comparison of the facial data of the person received from the optical sensor to stored identification data for a plurality of users, that the facial data matches a particular user of the plurality of users, wherein the stored identification data for the plurality of users is maintained in a database communicatively coupled to the optical sensor, wherein the database divides the plurality of users between a primary user level and a secondary user level, wherein the primary user level is associated with authorization to use the vehicle, wherein the secondary user level is associated with lack of authorization to use the vehicle unless use of the vehicle is authorized by the primary user level;

send a message to an electronic device associated with a primary user of the vehicle, wherein the primary user belongs to the primary user level as identified in the database, the message identifying an identity of the particular user based on the facial data of the person collected from the optical sensor within the vehicle and indicating that the person within the vehicle is attempting to use the vehicle;

receive a response from the electronic device associated with the primary user associated with the electronic device, wherein the response indicates that the primary user temporary authorizes the particular user to use the vehicle and identifies a time limitation and a location limitation for use of the vehicle by the particular user;

store data in the database that identifies that the particular user is the person within the vehicle and has a temporary status of a temporary user who is temporarily authorized to use the vehicle in accordance with the time limitation and the location limitation;

temporarily authorizing the person within the vehicle to temporarily use the vehicle while temporary use of the vehicle by the person complies with the time limitation and the location limitation stored in the database.

12. The system of claim 11, wherein the execution of the instructions stored in the at least one memory by the at least one processor causes the at least one processor to further:

receive gesture information indicative of a gesture performed by the person in the vehicle from the optical sensor; and cause a device within the vehicle to perform an action that corresponds to the gesture.

13. The system of claim 12, wherein the action is a zoom function, wherein the device within the vehicle includes a display, and wherein causing the device within the vehicle to perform the action includes using the zoom function to cause visual data to change from being displayed using the display at a first zoom level to being displayed using the display at a second zoom level in response to the gesture.

14. The system of claim 11, wherein the execution of the instructions stored in the at least one memory by the at least one processor causes the at least one processor to further:
  identify a stress level of the person within the vehicle based on additional image data collected by the optical sensor; and
  affect a function of the vehicle based on the stress level.

15. The system of claim 14, wherein the function is associated with operationality of the vehicle, wherein affecting the function of the vehicle based on the stress level includes temporarily terminating operationality of the vehicle while the stress level exceeds a specified stress level until the stress level of the person returns below the specified stress level.

16. The method of claim 1, further comprising:
  collecting acoustic information associated with the person at an acoustic sensor within the vehicle, the acoustic information including voice data of the person within the vehicle; and
  identifying, based on a comparison of the acoustic information to the stored identification data for the plurality of users, that the acoustic information matches the particular user of the plurality of users.

17. The non-transitory computer-readable storage medium of claim 6, the method further comprising:
  collecting acoustic information associated with the person at an acoustic sensor within the vehicle, the acoustic information including voice data of the person within the vehicle; and
  identifying, based on a comparison of the acoustic information to the stored identification data for the plurality of users, that the acoustic information matches the particular user of the plurality of users.

18. The system of claim 11, wherein the execution of the instructions stored in the at least one memory by the at least one processor causes the at least one processor to:
  receive acoustic information associated with the person from an acoustic sensor within the vehicle, the acoustic information including voice data of the person within the vehicle; and
  identify, based on a comparison of the acoustic information to the stored identification data for the plurality of users, that the acoustic information matches the particular user of the plurality of users.

* * * * *